(12) United States Patent
Kurata et al.

(10) Patent No.: US 8,632,238 B2
(45) Date of Patent: Jan. 21, 2014

(54) SURFACE LIGHT SOURCE DEVICE

(71) Applicant: OMRON Corporation, Kyoto (JP)

(72) Inventors: Gouo Kurata, Tsurugashima (JP);
Koichi Takemura, Konan (JP);
Tomofusa Shibata, Kyoto (JP);
Masayuki Shinohara, Nagaokakyou (JP)

(73) Assignee: OMRON Corporation, Kyoto-Shi (JP)

( * ) Notice: Subject to any disclaimer, the term of this patent is extended or adjusted under 35 U.S.C. 154(b) by 0 days.

(21) Appl. No.: 13/771,761

(22) Filed: Feb. 20, 2013

(65) Prior Publication Data

US 2013/0242614 A1    Sep. 19, 2013

(30) Foreign Application Priority Data

Mar. 15, 2012    (JP) .................................. 2012-058619

(51) Int. Cl.
*F21V 8/00*    (2006.01)
*G02B 6/00*    (2006.01)

(52) U.S. Cl.
USPC ............................ 362/615; 362/621; 362/617

(58) Field of Classification Search
USPC .................................................. 362/615–629
See application file for complete search history.

(56) References Cited

U.S. PATENT DOCUMENTS

| | | | | |
|---|---|---|---|---|
| 5,584,556 A * | 12/1996 | Yokoyama et al. | ............ | 362/625 |
| 5,711,592 A * | 1/1998 | Hotta | ............. | 362/496 |
| 6,044,196 A * | 3/2000 | Winston et al. | ............... | 385/146 |
| 6,942,374 B2 * | 9/2005 | Lee | ................. | 362/615 |
| 7,160,015 B2 * | 1/2007 | Parker | ............ | 362/612 |
| 7,188,989 B2 * | 3/2007 | Miyashita | ............ | 362/621 |
| 7,826,703 B2 * | 11/2010 | Iwasaki | ............ | 385/129 |
| 8,210,730 B2 * | 7/2012 | Kurata et al. | ............ | 362/606 |
| 2004/0124764 A1 * | 7/2004 | Suzuki et al. | ............ | 313/498 |
| 2007/0127263 A1 * | 6/2007 | Chang | ............ | 362/610 |

FOREIGN PATENT DOCUMENTS

WO    2010/070821 A1    6/2010

\* cited by examiner

*Primary Examiner* — Mariceli Santiago
(74) *Attorney, Agent, or Firm* — Nutter McClennen & Fish LLP; John J. Penny, V.

(57) ABSTRACT

A surface light source device has a point light source disposed opposite a light incident surface of a light guide plate. The light guide plate includes a light introduction part, and a light guide plate body having a thickness smaller than a maximum thickness of the light introduction part. The light introduction part includes an inclined surface inclined from a surface in a portion having a thickness larger than the thickness of the light guide plate body toward an end of the surface of the light guide plate body. The light guide plate body has a light exit pattern for reflecting the light in the light guide plate body to output the light from a light exit surface. In a region close to the point light source of the light guide plate body, the thickness of the light guide plate body increases gradually with distance from the point light source.

7 Claims, 8 Drawing Sheets

SURFACE LIGHT SOURCE DEVICE

TECHNICAL FIELD

The present invention relates to a surface light source device, and specifically to a surface light source device that is used as a backlight of a liquid crystal display.

BACKGROUND ART

Nowadays, there is an increasing demand for a low profile of a surface light source device with the progress of a low-profile mobile device provided with the surface light source device. In order to reduce a thickness of the surface light source device, it is necessary to reduce a thickness of a light guide plate. However, even if the flat light guide plate can be reduced in thickness, there is a limitation to reducing a height of a light source including an LED. Therefore, in the case where the thin, flat light guide plate is used, the height of the light source is larger than a thickness of an end surface (a light incident surface) of the light guide plate, and the light source disposed opposite to the light incident surface of the light guide plate projects above from an upper surface of the light guide plate. When the light source projects above from the light guide plate, light emitted from the light source is not entirely incident to the light incident surface of the light guide plate, and the light partially leaks to the outside to degrade use efficiency of the light.

In order to solve the above problem, there has been proposed a use of a light guide plate, in which a light introduction part having a larger thickness than a thickness of a flat light guide plate body is provided at an end of the light guide plate body and an inclined surface inclined from a maximum thickness point of the light introduction part toward the end of the light guide plate body is provided in the light introduction part. For example, WO 2010/070821 discloses a surface light source device in which the light guide plate is used.

FIG. 1A is a schematic diagram illustrating a surface light source device 11A in which a light guide plate 13 having a step-difference structure is used. The light guide plate 13 includes a light guide plate body 14 having a substantially even thickness and a wedge-shaped light introduction part 15. Light exit patterns 17, such as a deflection pattern and a diffusion pattern, are distributed in a rear surface of the light guide plate body 14. An inclined surface 16 is provided in the light introduction part 15. The inclined surface 16 is inclined from the maximum thickness point of the light introduction part 15 toward the end of the light guide plate body 14. A thickness of an end surface (a light incident surface 18) of the light introduction part 15 is larger than a height of a point light source 12. In the surface light source device 11A in which the light guide plate 13 is used, the thickness of the end surface of the light introduction part 15 is larger than the height of the point light source 12, whereby the light emitted from the point light source 12 is efficiently taken in the light introduction part 15. The light taken in the light introduction part 15 is guided to the light guide plate body 14 and spread in a flat manner, and the light is reflected or scattered by the light exit pattern 17, and output to the outside from a light exit surface 19 of the light guide plate body 14.

However, in the surface light source device 11A in which the inclined surface 16 is provided in the light introduction part 15 as illustrated in FIG. 1A, an angle formed by the light guided in the light guide plate 13 and a lower surface of the light guide plate 13 increases because the light is reflected by the inclined surface 16. Therefore, a directional characteristic of the light guided in the light guide plate 13 is vertically widened. Accordingly, when the light exit pattern 17 has the same distribution as the case where the light introduction part 15 does not exist (that is, the light guide plate having the even thickness), the light is easily reflected or scattered by the light exit pattern 17, a region close to the point light source 12 becomes brighter in the light exit surface 19, and the light exit surface 19 brightens up unevenly.

In the case of a surface light source device 11B in which the thickness of the light guide plate body 14 is reduced as illustrated in FIG. 1B, a frequency of the incidence of the light guided in the light guide plate body 14 to the lower surface of the light guide plate body 14 increases. Accordingly, when the light exit pattern 17 has the same distribution as the thick light guide plate body 14, the light is easily reflected or scattered by the light exit pattern 17, the region close to the point light source 12 becomes brighter in the light exit surface 19, and the light exit surface 19 brightens up unevenly.

Like a surface light source device 11C illustrated in FIG. 2A, in order to fully use the light in the light guide plate 13, namely, in order to prevent the light in the light guide plate 13 from being lost due to the leakage from the end surface on the side located farther away from the point light source 12, the light exit surface 19 may be inclined such that the thickness of the light guide plate body 14 is reduced with increasing distance from the point light source 12. In this case, the angle formed by the light and the lower surface of the light guide plate body 14 increases every time the light guided in the light guide plate 13 is reflected by the light exit surface 19. Thus, when the light exit pattern 17 has the same distribution as the light guide plate 13 having the even thickness, the light is easily reflected or scattered by the light exit pattern 17, the region close to the point light source 12 becomes brighter in the light exit surface 19, and the light exit surface 19 brightens up unevenly.

In the case where the light exit surface 19 brightens up unevenly while becoming brighter near the point light source 12, a method for decreasing distribution density (number density) of the light exit pattern 17 on the point light source side is conceivable as a countermeasure as illustrated in a surface light source device 11D of FIG. 2B.

However, when the number density of the light exit pattern 17 is decreased on the point light source side, the light exit pattern 17 becomes sparse on the point light source side, the light exit surface 19 brightens up unevenly, and the light exit patterns 17 brighten up as dots to form a bright spot.

In order to make the light exit pattern 17 less visible, there is also a method for reducing a size of the light exit pattern 17 to increase the number density of the light exit pattern 17. However, the light exit pattern 17 currently has the size of about 20 μm, and production accuracy of the light exit pattern 17 is hardly obtained when the size of the light exit pattern 17 is further reduced.

SUMMARY

One or more embodiments of the present invention has been made in view of the above technical problems, and an object thereof is to provide a surface light source device in which luminance of an emission surface is equalized while a light exit pattern is inconspicuous.

In accordance with at least one embodiment of the present invention, a surface light source device includes: a light source; and a light guide plate configured to introduces the light emitted from the light source through a light incident surface to output the light through a light exit surface, wherein the light guide plate includes: a light introduction part configured to trap the light emitted from the light source through the light incident surface, and a light guide plate body provided so as to be continuously joined to the light introduction part, a thickness of the light guide plate body being smaller than a maximum thickness of the light introduction part, the light introduction part includes an inclined surface on at least one of a surface on a light exit side of the light guide plate and an opposite surface thereof, the inclined surface being inclined from a surface in a portion having a thickness larger than the thickness of the light guide plate body toward an end of a surface of the light guide plate body, the light guide plate body includes a light exit pattern on at least one of a surface on the light exit side of the light guide plate and an opposite surface thereof, the light exit pattern configured for outputting the light in the light guide plate body through the light exit surface, and the thickness of the light guide plate body configured to be gradually increased with increasing distance from the light source in a region near the light source of the light guide plate body.

In the surface light source device according to at least one embodiment of the present invention, the thickness of the light guide plate body is gradually increased with increasing distance from the light source in the region near the light source of the light guide plate body. In the region, the light is reflected by the upper surface or the lower surface of the light guide plate body, whereby the light guide direction comes close to or is proximal to the direction perpendicular to the light incident surface to decrease a frequency of the incidence of the light to the upper surface or the lower surface of the light guide plate body. Therefore, in the case where the light introduction part is provided in the light guide plate, or in the case where the thickness of the light guide plate body is reduced, the light is reflected by the light exit pattern in the region near the light source of the light guide plate body and the light is hardly output through the light exit surface even if the distribution density of the light exit pattern is not decreased in the region near the light source of the light guide plate body. Accordingly, the emission surface can brighten up evenly or the luminance of the emission surface can be equalized while each light exit pattern does not conspicuously brighten up as a dot.

In the surface light source device according to at least one embodiment of the present invention, at least one of an upper surface and a lower surface of the light guide plate body is a gradient surface inclined outward with increasing distance from the light source in the region where the thickness of the light guide plate body is gradually increased. The gradient surface is an inclined surface, and the gradient surface may be a flat surface, a curved surface, and a bent surface. When the gradient surface is provided on at least one of the upper surface and the lower surface of the light guide plate body so as to be inclined outward (upward for the upper surface, and downward for the lower surface) with increasing distance from the light source, the light reflected by the gradient surface is proximal to or comes close to the horizontal direction. Therefore, the luminance can be decreased in the region near the light source, and the luminance of the emission surface can be equalized without decreasing the distribution density of the light exit pattern.

In the surface light source device, a maximum angle of inclination of the gradient surface is less than or equal to 17° in the region where the thickness of the light guide plate body is gradually increased. The effect of reflecting the light to change the direction of the light is maximized when the maximum angle of inclination of the gradient surface is less than or equal to in the region where the thickness of the light guide plate body is gradually increased.

The effect is decreased when the angle of inclination of the gradient surface exceeds the maximum angle of inclination at which the effect is maximized. The generally-used light guide plate has refractive indices of 1.43 to 2.14, and the maximum efficiency is obtained at the angle of 17° in the refractive indices of 1.43 to 2.14. Therefore, the maximum angle of inclination of the gradient surface is desirably less than or equal to 17°.

In the surface light source device, an angle of inclination of the gradient surface is preferably gradually decreased with increasing distance from the light source in the region where the thickness of the light guide plate body is gradually increased. Generally, in the light exit pattern, because the distribution density is increased with increasing distance from the light source, the light exit pattern becomes inconspicuous with increasing distance from the light source. Therefore, the angle of inclination of the gradient surface is preferably gradually decreased with increasing distance from the light source.

In the surface light source device according to at least one embodiment of the present invention, in an end portion on a side closer to the light source in a region where the light exit pattern of the light guide plate body is formed, the thickness of the light guide plate body is gradually increased with increasing distance from the light source. The thickness of the light guide plate is increased in the end portion on the side closer to the light source in the region where the light exit pattern is formed to prevent the excessive leakage of the light in the region near the light source where the light exit pattern is formed.

In the surface light source device according to at least one embodiment of the present invention, a maximum thickness of the light guide plate body in an emission region is less than or equal to 0.4 mm. The surface light source device according to at least one embodiment of the present invention is effectively applied to the light guide plate body having the maximum thicknesses of 0.4 mm or less.

In the surface light source device according to at least one embodiment of the present invention, the thickness of the light guide plate body is gradually reduced with increasing distance from the light source in a region farther away from the light source of the light guide plate body. When the thickness of the light guide plate body is gradually reduced with increasing distance from the light source in the region farther away from the light source of the light guide plate body, the light reflected in the region easily strikes on the light exit pattern. Therefore, the light can fully be consumed to decrease the loss of the light in the region farther away from the light source.

At least one embodiment of the present invention has the feature that the above constituents are properly combined, and many variations can be made in the invention by the combinations of the constituents.

DETAILED DESCRIPTION

Hereinafter, preferred embodiments of the present invention will be described in detail with reference to the accompanying drawings. However, the present invention is not limited to the following embodiments, and various design changes can be made without departing from the scope of the present invention.

First Embodiment

Figure 3:
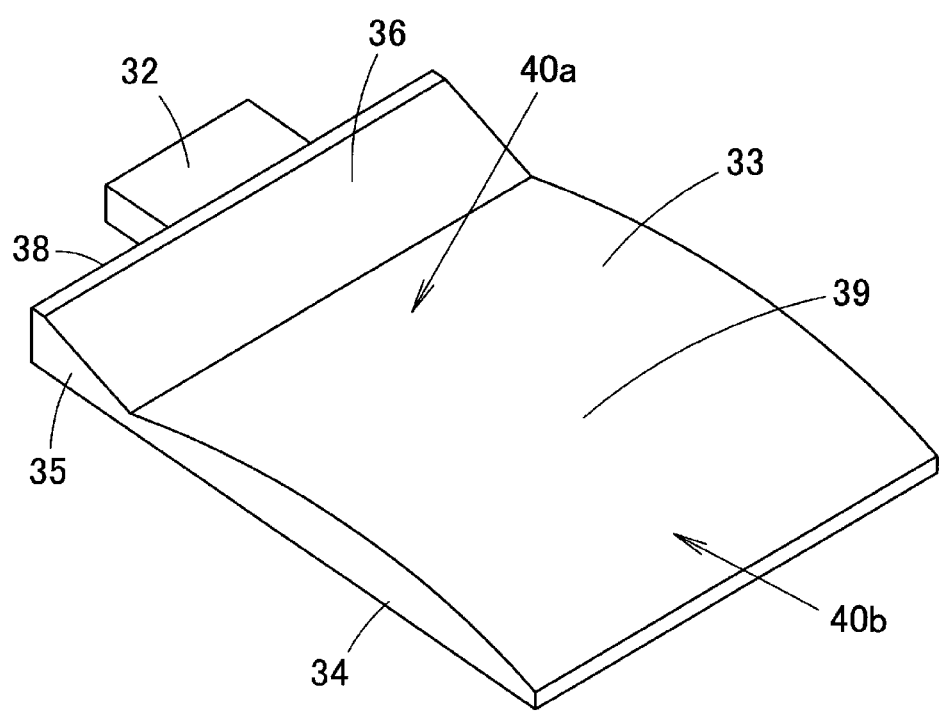
FIG. 3 is a perspective view illustrating a surface light source device according to a first embodiment of the present invention.
Figure 4:
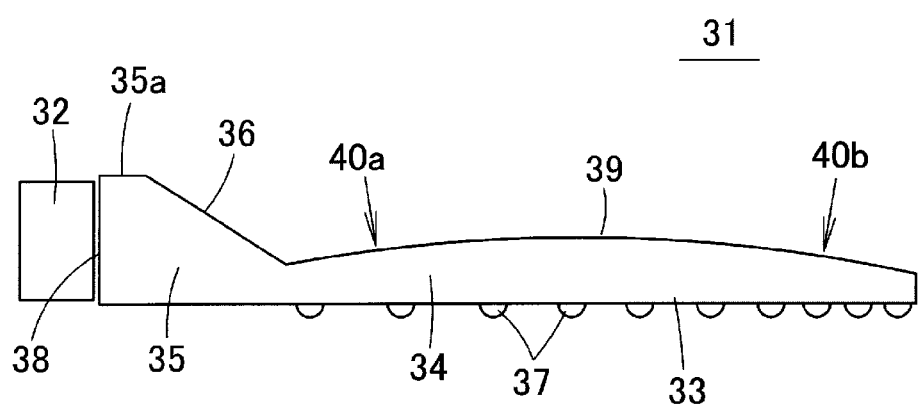
FIG. 4 is a schematic side view illustrating the surface light source device in FIG. 3.
Figure 5:
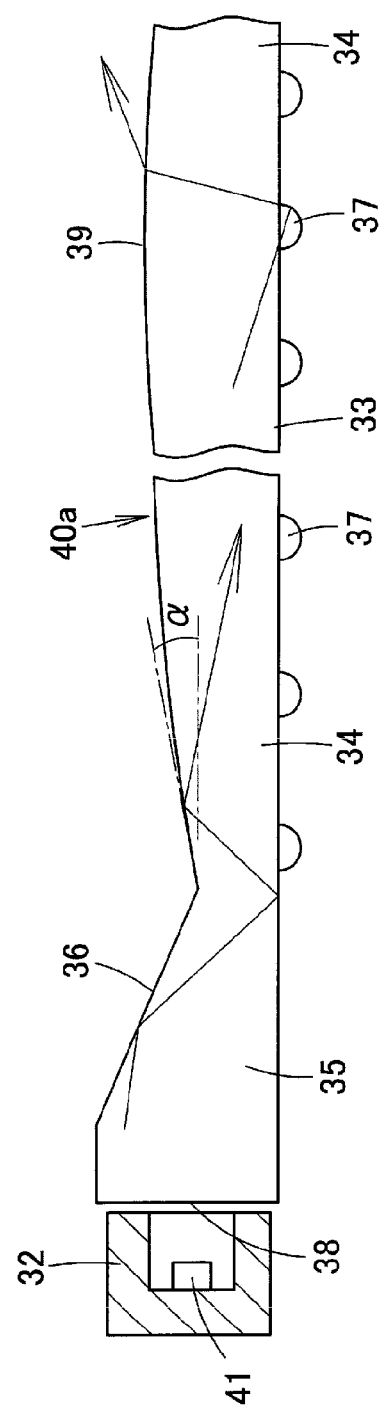
FIG. 5 is a view illustrating a behavior of light in the surface light source device in FIG. 3.

A surface light source device 31 according to a first embodiment of the present invention will be described below with reference to FIGS. 3 to 5. FIG. 3 is a perspective view illustrating the surface light source device 31 of the present invention. FIG. 4 is a schematic side view illustrating the surface light source device 31. FIG. 5 is a view illustrating a behavior of light in the surface light source device 31.

The surface light source device 31 includes a point light source 32 (light source) and a light guide plate 33 configured to introduce light emitted from the light source 32 through a light incident surface to output the light through a light exit surface. As illustrated in FIG. 5, the point light source 32 is provided with one or a plurality of LEDs 41. In the point light source 32, the LED 41 emits light to output white light from a light exit window (emission surface) of a front surface. The point light source 32 is smaller than a width of the light guide plate 33, and the point light source 32 is called a point light source whereas a cold-cathode tube is called a linear light source.

In the light guide plate 33, a light introduction part 35 is provided in an end surface of a thin-plate-like light guide plate body 34 so as to be continuously joined to the light guide plate body 34. The light guide plate 33 is integrally formed using high-refractive-index transparent resins, such as an acrylic resin, a polycarbonate resin (PC), a cycloolefin-based material, and polymethylmethacrylate (PMMA).

The light introduction part 35 is a substantially wedge-shaped, thick portion in the light guide plate 33. The point light source 32 is disposed opposite to a part of a light incident surface 38 that is an end surface of the light introduction part 35. A thickness of the end surface of the light introduction part 35 is greater than or equal to a height of the light exit window of the point light source 32. Therefore, the light emitted from the point light source 32 is efficiently incident from the light incident surface 38 to the light introduction part 35, and the use efficiency of the light of the surface light source device 31 is enhanced.

An inclined surface 36 is formed in an upper surface (a surface on the same side as a light exit surface 39 of the light guide plate body 34) or a lower surface of the light introduction part 35. The inclined surface 36 is inclined from a maximum thickness portion (flat part 35a) near the light incident surface 38 toward an end of the light guide plate body 34. The band-like inclined surface 36 extends from one of side edges of the light guide plate 33 to the other side edge.

The light guide plate body 34 occupies most part of an area of the light guide plate 33. As illustrated in FIGS. 3 and 4, the thickness of the light guide plate body 34 is smaller than the maximum thickness of the light introduction part 35, thereby achieving the low profile of the light guide plate 33. The upper surface of the light guide plate body 34 constitutes the light exit surface 39. The whole or both end portions of the light exit surface 39 are curved into a substantially arc shape in sections perpendicular to the light incident surface 38 and the lower surface of the light guide plate body 34. The light exit surface 39 has a substantially even thickness in a section parallel to the light incident surface 38.

An upper surface in a light-source side edge portion of the light guide plate body 34 constitutes a curved first gradient surface 40a. The first gradient surface 40a is inclined upward with increasing distance from the point light source 32, and the light-source side edge portion of the light guide plate body 34 is gradually increased in thickness with increasing distance from the point light source 32. When measured upward from a horizontal surface (in the first embodiment, the lower surface of the light guide plate body 34), an angle of inclination ($\alpha$) of the first gradient surface 40a is gradually decreased with increasing distance from the point light source 32. Accordingly, the first gradient surface 40a is curved so as to swell upward.

An upper surface in the end portion located on the side farther away from the light source of the light guide plate body 34 constitutes a curved second gradient surface 40b. The second gradient surface 40b is inclined downward with increasing distance from the point light source 32, and the end portion located on the side farther away from the light source of the light guide plate body 34 is gradually reduced in thickness with increasing distance from the point light source 32. When measured downward from the horizontal surface, an angle of inclination of the second gradient surface 40b is gradually increased with increasing distance from the point light source 32. Accordingly, the second gradient surface 40b is curved so as to swell upward.

In a central portion of the light guide plate body 34, the upper surface of the light guide plate body 34 may be flat or curved.

A surface opposite to the light exit surface 39 in the light guide plate body 34 (a lower surface of the light guide plate body 34) is a horizontal, flat surface orthogonal to the light incident surface 38, and a light exit pattern 37 is formed in the lower surface of the light guide plate body 34. The light exit pattern 37 may be configured to output the light in the light guide plate body 34 through the light exit surface 39. In FIGS. 4 and 5, a spherical projection is illustrated as the light exit pattern 37. Alternatively, the light exit pattern 37 may be a projection formed into a conical shape and a pyramid shape (front edges of both shapes may be dull) and an elliptical shape, or a recess may be formed in the light exit pattern 37. In order to equalize a luminance distribution of the light guide plate body 34, the light exit pattern 37 has the small distribution density (number density) in the region near the point light source 32, and the distribution density of the light exit pattern 37 is gradually increased with increasing distance from the point light source 32.

Therefore, in the surface light source device 31, the light emitted from the point light source 32 is incident from the light incident surface 38 to the light introduction part 35. As illustrated in FIG. 5, the light incident to the light introduction part 35 is reflected by the upper surface or the lower surface of the light introduction part 35, or passes through the light introduction part 35 and is introduced to the thin light guide plate body 34. The light introduced to the light guide plate body 34 is guided in the light guide plate body 34 while being reflected by the upper surface and the lower surface of the light guide plate body 34. Then, the light is reflected by the light exit pattern 17 and output to the outside from the light exit surface 39.

When the light incident from the light introduction part 35 to the light guide plate body 34 is reflected by the first gradient surface 40a, as illustrated in FIG. 5, the light is proximal to or comes close to the horizontal direction since the angle formed with the lower surface of the light guide plate body 34 becomes smaller than that before the light is incident to the first gradient surface 40a, and the directional pattern is vertically narrowed. Since the directional pattern is vertically narrowed in the light reflected by the first gradient surface 40a, a frequency of the incidence of the light to the lower surface of the light guide plate body 34 is lowered in the region near the light source of the light guide plate body 34. Therefore, a probability that the light is reflected by the light exit pattern 37 and output from the light exit surface 39 is small even if the light exit pattern 37 has the large distribution density (number density). Accordingly, even if the light exit pattern 37 has the large distribution density (number density), the luminance distribution can be equalized in the emission surface of the light guide plate body 34. On the other hand, when the distribution density of the light exit pattern 37 is increased in the region near the light source, the light exit pattern 37 is seen while brightening up evenly and continuously. Therefore, each light exit pattern 37 is not seen in the region near the light source because the light exit pattern 37 does not brighten up as a dot, and the light exit pattern 37 becomes inconspicuous.

Figure 1A:
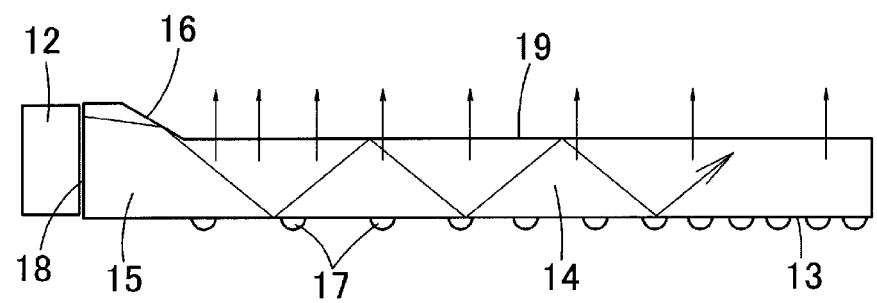
FIG. 1A is a schematic diagram illustrating a conventional surface light source device in which a light guide plate including a light guide plate body and a light introduction part is used.
Figure 1B:
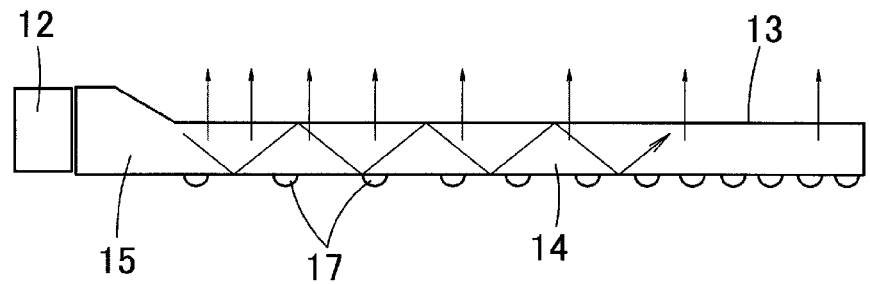
FIG. 1B is a schematic diagram illustrating the conventional surface light source device in which a thickness of the light guide plate body is reduced.
Figure 2A:
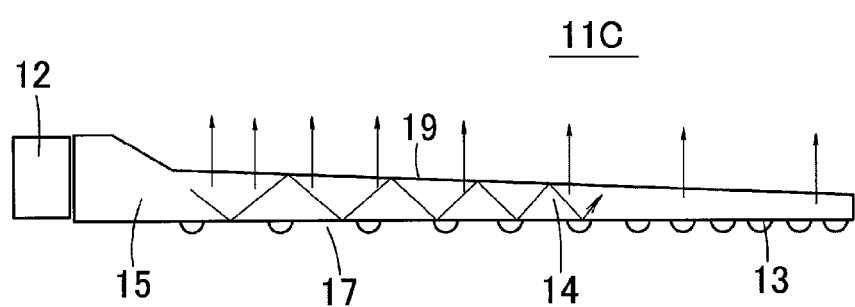
FIG. 2A is a schematic diagram illustrating the conventional surface light source device in which the thickness of the light guide plate body is reduced with increasing distance from a point light source.
Figure 2B:
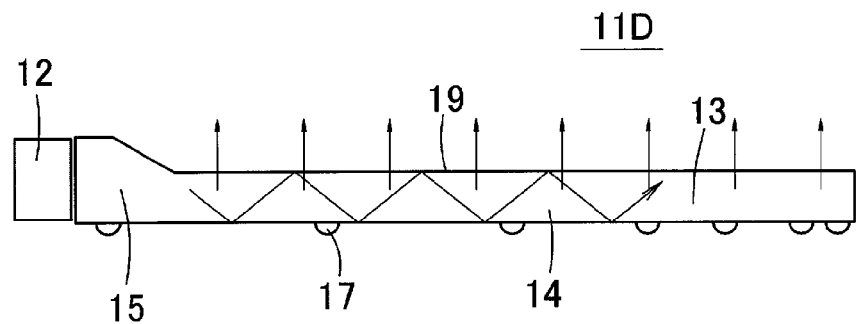
FIG. 2B is a schematic diagram illustrating a conventional surface light source device in which number density of a light exit pattern is decreased on a light source side in order to equalize luminance of an emission surface.

As a result, in the case where the light introduction part 35 is provided in the end portion of the light guide plate 33, or in the case where the light guide plate body 34 is thin, the distribution density of the light exit pattern 37 is increased, and the luminance can be equalized while the light exit pattern 37 is inconspicuous. Conventionally, in the case where the light introduction part 35 is provided in the light guide plate 33, or in the case where the light guide plate body 34 is thin, the luminance becomes uneven as illustrated in FIGS. 1A and 1B when the distribution density of the light exit pattern 37 is large, and the light exit pattern 37 becomes conspicuous on the light source side as illustrated in FIG. 2B when the distribution density of the light exit pattern 37 is small. According to the first embodiment, such a problem is solved.

It is assumed that the light exit pattern 37 is formed in the lower surface of the flat light guide plate, in which the upper surface and the lower surface are parallel to each other, such that a luminance distribution is equalized. When the distribution density of the light exit pattern 37 in the lower surface is increased by 20%, the region near the light source becomes brighter which reduces the evenness of the luminance distribution. On the other hand, the luminance distribution can be equalized when the first gradient surface 40a having the angle of inclination of about 0.05° is provided in the upper surface of the light guide plate body 34 while the distribution density of the light exit pattern 37 is increased by 20%. When the thickness of the light guide plate body 34 is increased to equalize the luminance distribution while the distribution density of the light exit pattern 37 is increased by 20%, it is necessary to increase the thickness of the light guide plate body 34 by about 20% to obtain the thickness of about 0.3 mm, significance of the low profile of the light guide plate or the surface light source device decreases.

With increasing distance from the point light source 32, the light is consumed to decrease the introduced light amount, and the distribution density of the light exit pattern 37 is also increased, whereby the light exit pattern 37 is hardly seen. Therefore, because the first gradient surface 40a gradually becomes unnecessary with increasing distance from the point light source 32, the angle of inclination of the first gradient surface 40a is decreased with increasing distance from the point light source 32. The increase in thickness of the light guide plate body 34 can be avoided by gradually decreasing the angle of inclination of the first gradient surface 40a.

When the direction of the light guided in the light guide plate body 34 is proximal to or comes close to the horizontal direction, the light guided in the light guide plate body 34 is not output from the light exit surface 39 due to the light exit pattern 37, and the light reaches the end surface on the side farther away from the point light source 32 of the light guide plate body 34, which results in a risk that the light leaks from the end surface resulting in light loss. Therefore, in the end portion farther away from the point light source 32 of the light guide plate body 34, the second gradient surface 40b is provided in the upper surface of the light guide plate body 34. The second gradient surface 40b is inclined downward with increasing distance from the point light source 32, and the thickness of the end portion is gradually made smaller on the opposite side of the point light source 32 with respect to the light guide plate body 34. As a result, the incident angle with respect to the lower surface of the light guide plate body 34 increases in the light reflected by the second gradient surface 40b, the light is easily output from the light exit surface 39 by the light exit pattern 37, and the light is fully consumed.

Figure 6:
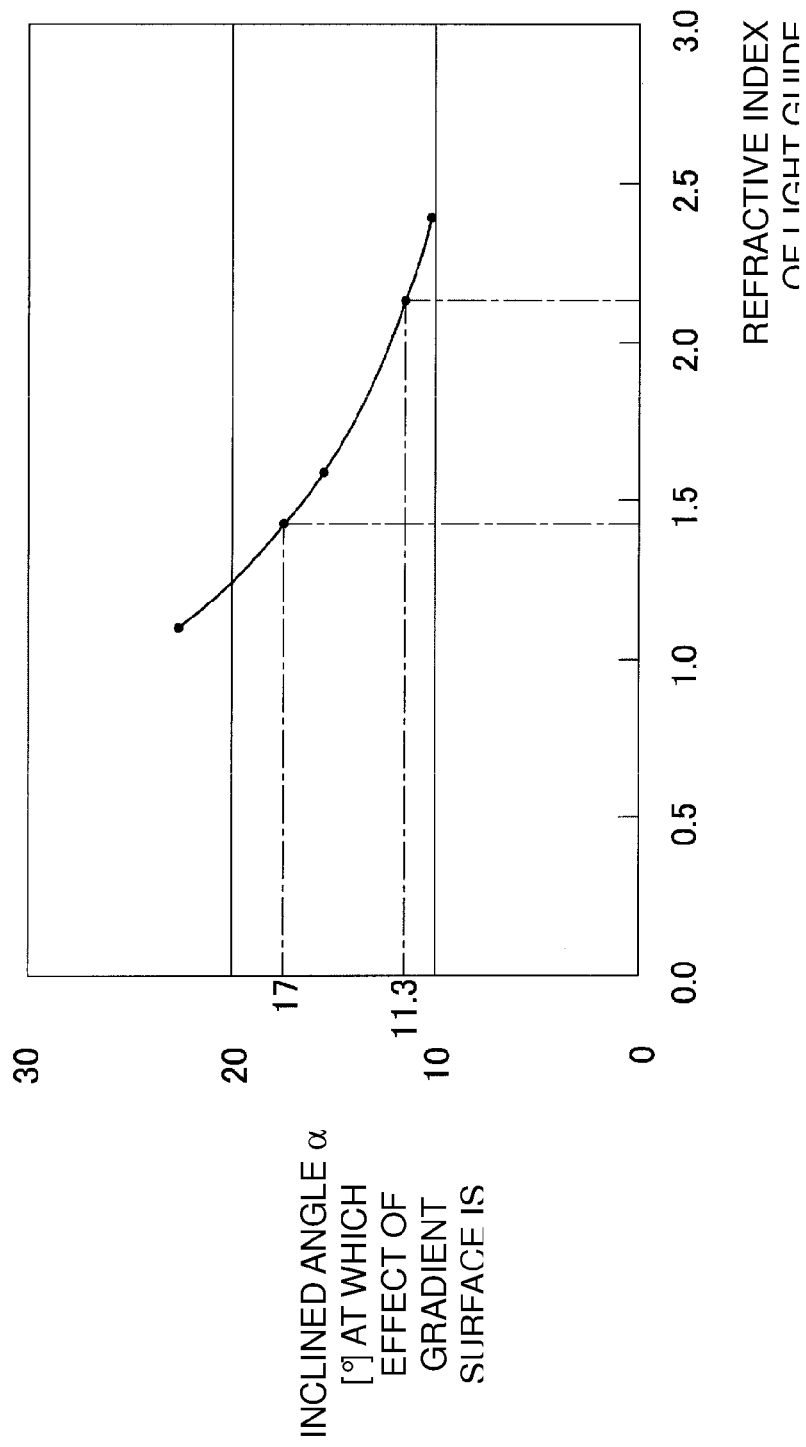
FIG. 6 is a view illustrating a relationship between a refractive index of the light guide plate and an angle of inclination at which an effect is maximized.

When the angle of inclination of the first gradient surface 40a increases, the effect that the direction of the reflected light is brought close to the horizontal direction to vertically narrow the directional pattern is enhanced. However, when the angle of inclination of the first gradient surface 40a increases excessively, the amount of light incident to the first gradient surface 40a decreases to lower the effect as a whole. Accordingly, in the first gradient surface 40a, there is the angle of inclination ($\alpha$) at which the effect to convert the directional pattern is maximized. The angle of inclination ($\alpha$) at which the effect is maximized depends on a refractive index of the light guide plate 33. FIG. 6 illustrates a relationship between the refractive index of the light guide plate 33 and the angle of inclination ($\alpha$) at which the effect is maximized. As can be seen from FIG. 6, the angle of inclination ($\alpha$) at which the effect is maximized ranges from 17° to 11.3° since the light guide plate 33 generally has refractive indices of 1.43 to 2.14. Therefore, because the effect is insufficiently obtained when the angle of inclination ($\alpha$) is set to 17° or more, the first gradient surface 40a desirably has angles of inclination of 17° or less.

When the light guide plate body 34 is thick, the problem in the conventional example is hardly generated. Thus, the present invention is effectively applied to the case where the light guide plate body 34 has a maximum thickness of 0.4 mm or less.

Second Embodiment

Figure 7A:
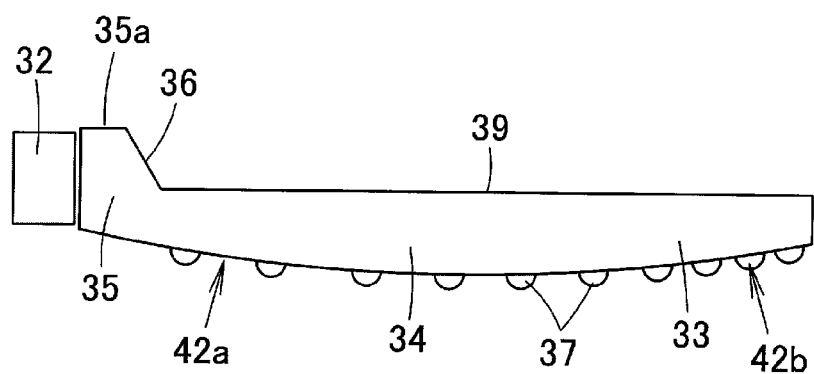
FIGS. 7A and 7B are schematic side views each illustrating a surface light source device according to another embodiment of the present invention.

FIG. 7A is a schematic side view illustrating a surface light source device according to a second embodiment of the present invention. In the second embodiment, the upper surface of the light guide plate body 34 constitutes a flat surface. The lower surface of the light guide plate 33 is curved, and the light exit pattern 37 is provided in the lower surface of the light guide plate body 34.

The lower surface in the light-source side edge portion of the light guide plate body 34 constitutes a curved first gradient surface 42a. The first gradient surface 42a is inclined downward with increasing distance from the point light source 32, and the light-source side edge portion of the light guide plate body 34 is gradually increased in thickness with increasing distance from the point light source 32. When measured downward from the horizontal surface, the angle of inclination (a) of the first gradient surface 42a is gradually decreased with increasing distance from the point light source 32. Accordingly, the first gradient surface 42a is curved so as to swell downward.

The lower surface in the end portion located on the side farther away from the light source of the light guide plate body 34 constitutes a curved second gradient surface 42b. The second gradient surface 42b is inclined upward with increasing distance from the point light source 32, and the end portion located on the side farther away from the light source of the light guide plate body 34 is gradually reduced in thickness with increasing distance from the point light source 32. When measured upward from the horizontal surface, the angle of inclination of the second gradient surface 42b is gradually increased with increasing distance from the point light source 32. Accordingly, the second gradient surface 42b is curved so as to swell downward.

The same effect as the surface light source device 31 of the first embodiment is obtained in the surface light source device of the second embodiment having the above structure.

Third Embodiment

Figure 7B:
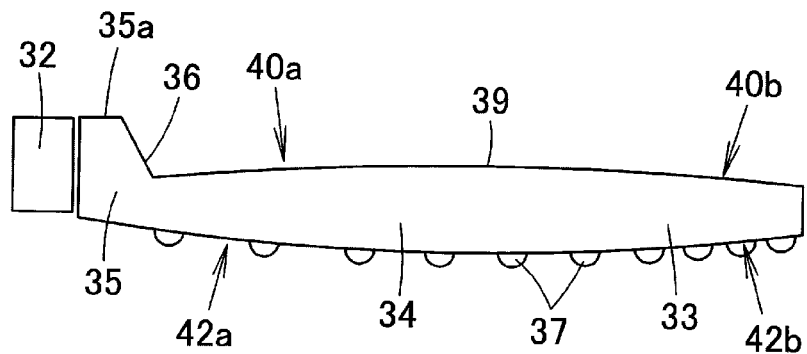

FIG. 7B is a schematic side view illustrating a surface light source device according to a third embodiment of the present invention. In the light-source side edge portion of the light guide plate body 34, the first gradient surface 40a, which is inclined upward with increasing distance from the point light source 32 and curved so as to swell upward, is provided in the upper surface of the light guide plate body 34, and the first gradient surface 42a, which is inclined downward with increasing distance from the point light source 32 and curved so as to swell downward, is provided in the lower surface of the light guide plate body 34. As a result, the light-source side edge portion of the light guide plate body 34 is gradually increased in thickness with increasing distance from the point light source 32.

In the end portion located on the side farther away from the light source of the light guide plate body 34, the second gradient surface 40b, which is inclined downward with increasing distance from the point light source 32 and curved so as to swell upward, is provided in the upper surface of the light guide plate body 34, and second gradient surface 42b, which is inclined upward with increasing distance from the point light source 32 and curved so as to swell downward, is provided in the lower surface of the light guide plate body 34. As a result, the end portion located on the side farther away from the light source of the light guide plate body 34 is gradually reduced in thickness with increasing distance from the point light source 32.

The same effect as the surface light source device 31 of the first embodiment is obtained in the surface light source device of the third embodiment having the above structure.

Fourth Embodiment

Figure 8A:
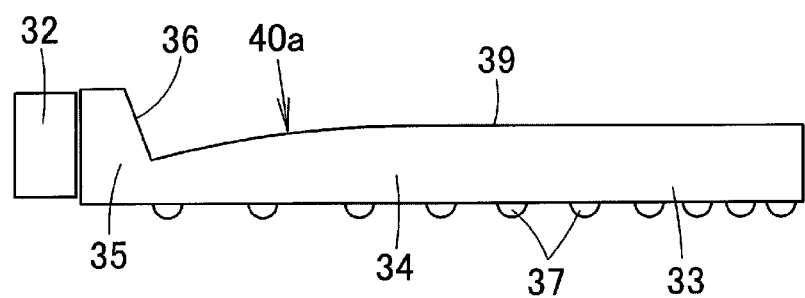
FIGS. 8A and 8B are schematic side views each illustrating a surface light source device according to another embodiment of the present invention.

FIG. 8A is a schematic side view illustrating a surface light source device according to a fourth embodiment of the present invention. In the surface light source device of the fourth embodiment, the first gradient surface 40a (or the first gradient surface 42a) is provided in the region near the light source of the light guide plate body 34, and the light guide plate body 34 has the even thickness in the central portion of the light guide plate body 34 and the end portion located on the side farther away from the point light source 32. In the fourth embodiment, in the case where the light may leak from the end surface on the side farther away from the point light source 32, a light reflecting tape may be attached to the end surface.

Fifth Embodiment

Figure 8B:
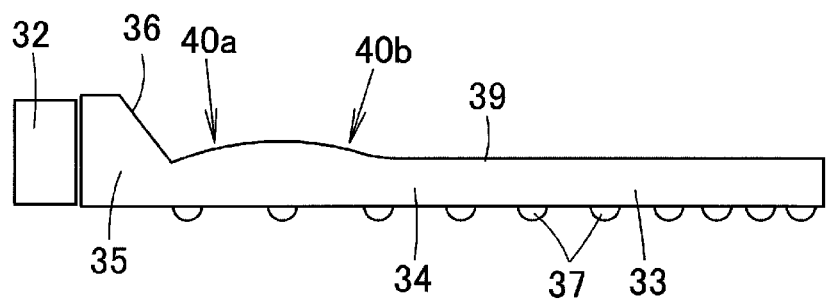

FIG. 8B is a schematic side view illustrating a surface light source device according to a fifth embodiment of the present invention. In the surface light source device of the fifth embodiment, the first gradient surface 40a is provided in the region near the light source of the light guide plate body 34, and the second gradient surface 40b is provided at the position relatively near the first gradient surface 40a. Because the distribution density of the light exit pattern 37 is gradually increased with increasing distance from the point light source 32, the directional pattern that is widened by the first gradient surface 40a may be vertically narrowed again by the second gradient surface 40b at the point, which is distant from the point light source 32 and in which the amount of guided light is decreased to a certain extent.

In addition to the above embodiments, the inclined surface 36 may be provided in the lower surface of the light introduction part 35, and the first gradient surface 40a and the second gradient surface 42b (or the first gradient surface 42a and the second gradient surface 40b) may be combined.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:
1. A surface light source device comprising:
a light source; and
a light guide plate configured to introduces light emitted from the light source through a light incident surface to output the light through a light exit surface, the light guide plate including a light introduction part configured to traps the light emitted from the light source through the light incident surface, the light guide plate including a light guide plate body being provided to be continuously joined to the light introduction part, a thickness of the light guide plate body being smaller than a maximum thickness of the light introduction part, wherein
the light introduction part includes an inclined surface on at least one of a surface on a light exit side of the light guide plate and an opposite surface thereof, the inclined surface is inclined from a surface in a portion having a thickness larger than the thickness of the light guide plate body toward an end of a surface of the light guide plate body, the light guide plate body includes a light exit pattern on at least one of a surface on the light exit side of the light guide plate and an opposite surface thereof, the light exit pattern configured to outputs the light in the light guide plate body through the light exit surface, and the thickness of the light guide plate body is configured to be gradually increased with increasing distance from the light source in a region near the light source of the light guide plate body.

2. The surface light source device according to claim 1, wherein at least one of an upper surface and a lower surface of the light guide plate body is a gradient surface inclined outward with increasing distance from the light source in the region where the thickness of the light guide plate body is gradually increased.

3. The surface light source device according to claim 2, wherein a maximum angle of inclination of the gradient surface is less than or equal to 17° in the region where the thickness of the light guide plate body is gradually increased.

4. The surface light source device according to claim 2, wherein an angle of inclination of the gradient surface is gradually decreased with increasing distance from the light source in the region where the thickness of the light guide plate body is gradually increased.

5. The surface light source device according to claim 1, wherein, in an end portion on a side closer to the light source in a region where the light exit pattern of the light guide plate body is formed, the thickness of the light guide plate body is gradually increased with increasing distance from the light source.

6. The surface light source device according to claim 1, wherein a maximum thickness of the light guide plate body in an emission region is less than or equal to 0.4 mm.

7. The surface light source device according to claim 1, wherein the thickness of the light guide plate body is gradually reduced with increasing distance from the light source in a region farther away from the light source of the light guide plate body.

* * * * *